(12) United States Patent
Perng

(10) Patent No.: US 7,273,123 B2
(45) Date of Patent: Sep. 25, 2007

(54) ELECTRIC BICYCLE POWER STRUCTURE

(76) Inventor: Te-Yu Perng, P.O. Box No. 6-57, Junghe, Taipei 235 (TW)

( * ) Notice: Subject to any disclaimer, the term of this patent is extended or adjusted under 35 U.S.C. 154(b) by 331 days.

(21) Appl. No.: 10/978,370

(22) Filed: Nov. 2, 2004

(65) Prior Publication Data
US 2006/0090943 A1    May 4, 2006

(51) Int. Cl.
*B62M 23/02* (2006.01)
(52) U.S. Cl. ...................... 180/205; 180/205
(58) Field of Classification Search ............ 180/205, 180/207, 220
See application file for complete search history.

(56) References Cited
U.S. PATENT DOCUMENTS

| | | | | | |
|---|---|---|---|---|---|
| 4,410,060 | A | * | 10/1983 | Cunard | 180/205 |
| 5,242,028 | A | * | 9/1993 | Murphy et al. | 180/220 |
| 6,276,479 | B1 | * | 8/2001 | Suzuki et al. | 180/207 |
| 6,296,072 | B1 | * | 10/2001 | Turner | 180/220 |
| 6,336,516 | B1 | * | 1/2002 | McNelly | 180/206 |
| 6,629,574 | B2 | * | 10/2003 | Turner | 180/206 |

* cited by examiner

*Primary Examiner*—Lesley D. Morris
*Assistant Examiner*—Marc A. Scharich
(74) *Attorney, Agent, or Firm*—Troxell Law Office, PLLC

(57) ABSTRACT

An electric bicycle power structure includes a motor, a power exchange device and pedal interlocking shafts; and provides power through the motor or the pedaling pedal interlocking shafts, wherein the powerexchange device automatically switches between the motor and the pedal interlocking shafts to accomplish power saving effects. The power exchange device has a planet decelerating mechanism, a clutch and a chain wheel cover. The power exchange device is located between the motor and the pedal interlocking shaft and is capable of directly switching between these power generating devices. A chain is used to impel the gear and wheel at the chain wheel cover, and an existing transmission gear of the bicycle is employed for accomplishing transmission effects, thereby decreasing numbers of parts without changing designs of the bicycle to further reduce production costs.

4 Claims, 6 Drawing Sheets

ELECTRIC BICYCLE POWER STRUCTURE

BACKGROUND OF THE INVENTION (a) Field of the Invention

The invention relates to an electric bicycle power structure, and more particularly, to an electric bicycle power structure comprising a motor, a power exchange device and pedal interlocking shafts and providing power through the motor or pedaling means, wherein the power exchange device automatically switches between power generating devices for accomplishing power savings effects.

(b) Description of the Prior Art

Thanks to uplifting of environmental protection awareness for reducing environmental pollution, a second transportation means is commonly adopted. Using bicycles or electric bicycles as transportation means for short-distance or shopping trips is not only free from resulting in pollution, but also solves an issue as-lack of exercise of modern people. Take a prior electric bicycle for an example, an electric motor is installed at the bicycle and is for providing electric power through electric cells. A front wheel or a rear wheel of the bicycle is impelled using a belt so as to provide the bicycle with power for moving forward. When pedaling according to prior art, gear plates are driven by a rotation chain in order to provide power. However, for the aforesaid electric bicycle, a switching device is needed for switching between electric cells or pedaling means that provide the bicycle with power for moving forward or backward. With respect to usage of the bicycle, power is merely offered at a specific moment relative to one direction and thus incurring complications during usage. Moreover, parts like the switching device and belt are additionally installed to further unnecessarily expanding production costs.

Therefore, the invention provides a power structure that includes pedals and a motor thereof as coaxial members without affecting each other during rotation, such that power is produced by simultaneous pedaling and motor means, or selectively by either the motor or pedaling means to further move the bicycle forward or backward. Using the power exchange device to determine whether pedaling or motor means outputs greater power, a sequence of assistant power is adjusted, thereby achieving power saving effects, providing enhanced usage conveniences, and effectively reducing production costs without having to make great modifications to the existing main body and cutting out numbers of parts of the bicycle.

SUMMARY OF THE INVENTION

In view of the aforesaid shortcomings of prior art, the primary object of the invention is to provide a power structure particularly applied to an electric bicycle, and capable of generating power while automatically switching between pedaling or motor means, thereby achieving power saving effects, offering enhanced usage conveniences by eliminating switching complications, and reducing production costs.

To accomplish the aforesaid object, the electric bicycle power structure according to the invention comprises a motor, a power exchange device and pedal interlocking shafts. The motor has, a hollow tube forming an axis, which is provided with a gear at an appropriate position at a front end thereof. The power exchange device has, a planet decelerating mechanism, a clutch and a chain wheel cover; is connected to an interior of the planet decelerating mechanism having a front end thereof disposed with the clutch. The hollow tube has a center thereof pivotally disposed with a central axis of the pedal interlocking shaft, wherein the central axis has outer covers at two sides thereof. Each of the outer covers is disposed with a roller bearing at an interior thereof, and is accommodated around an outer wall of the axis. A position where the pedal interlocking shaft at one side of the bicycle joins with the chain wheel cover is provided with the joining cover. The joining cover is disposed with a one-directional axis at an interior thereof; and has a front end thereof accommodated by an inner wall of the outer cover of the pedal interlocking shaft, and a rear end thereof fastened in the chain wheel cover. The chain wheel cover is disposed with a plurality of teeth at an outer wall thereof, and is connected to an existing transmission system of the bicycle to provide power.

According to the aforesaid structure, when a rotational speed of motor means is greater than that of pedaling means, power produced by the motor is consequently larger than that produced by pedaling. Energy generated from rotation is inputted to the planet decelerating mechanism by the axis of the motor, so that the rotational speed is lowered to increase torque during rotation. The front end of the planet decelerating mechanism is directly joined with the clutch, such that the gear at the outer side of the chain wheel cover is impelled and rotated by leaning the clutch against the chain wheel cover. In the aforesaid process, for that a position where the pedal interlocking shaft at one side of the bicycle joins with the chain wheel cover is provided with the one-directional axis, when power produced by the motor is greater than that produced by pedaling, the pedals become idle and thus no power is generated by the pedals. When power produced by pedaling is greater than that produced by the motor, the one-directional axis at the joined position of the pedal interlocking shaft and the chain wheel cover becomes capable of inputting power generated by pedaling toward the chain wheel cover while forcing the clutch inside the chain wheel cover to approach the center. Therefore, power generated and outputted by the motor fails to be forwarded to the chain wheel cover. Also, the one-directions is driven by the central axis of the pedal interlocking shaft to forward the power to the chain wheel cover, followed by driving chains through the gear to further rotate wheels of the bicycle, thereby accomplishing automatically switching between power generating means for power saving effects and providing enhanced usage conveniences. By applying the structure according to the invention, current transmission systems of prior bicycles can still be used while offering more power requirement options. Furthermore, not only numbers of parts can be decreased to significantly lower a volume of the power structure according to the invention when installed to a bicycle main body, but also production costs can be effectively reduced without having to greatly change current designs of the bicycle.

DETAILED DESCRIPTION OF THE PREFERRED EMBODIMENTS

Figure 1:
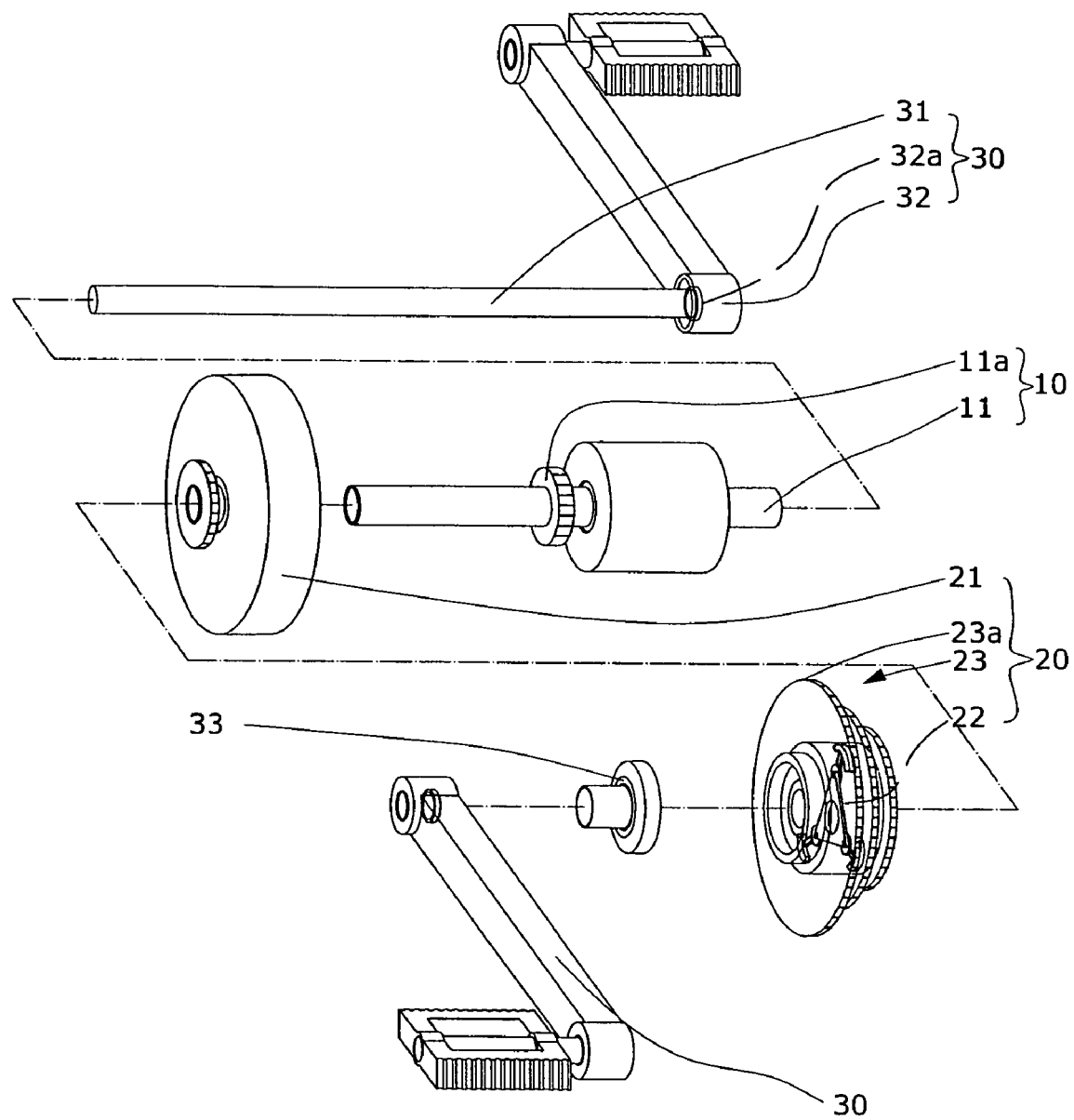
FIG. 1 shows an exploded elevational view according to the invention.
Figure 2:
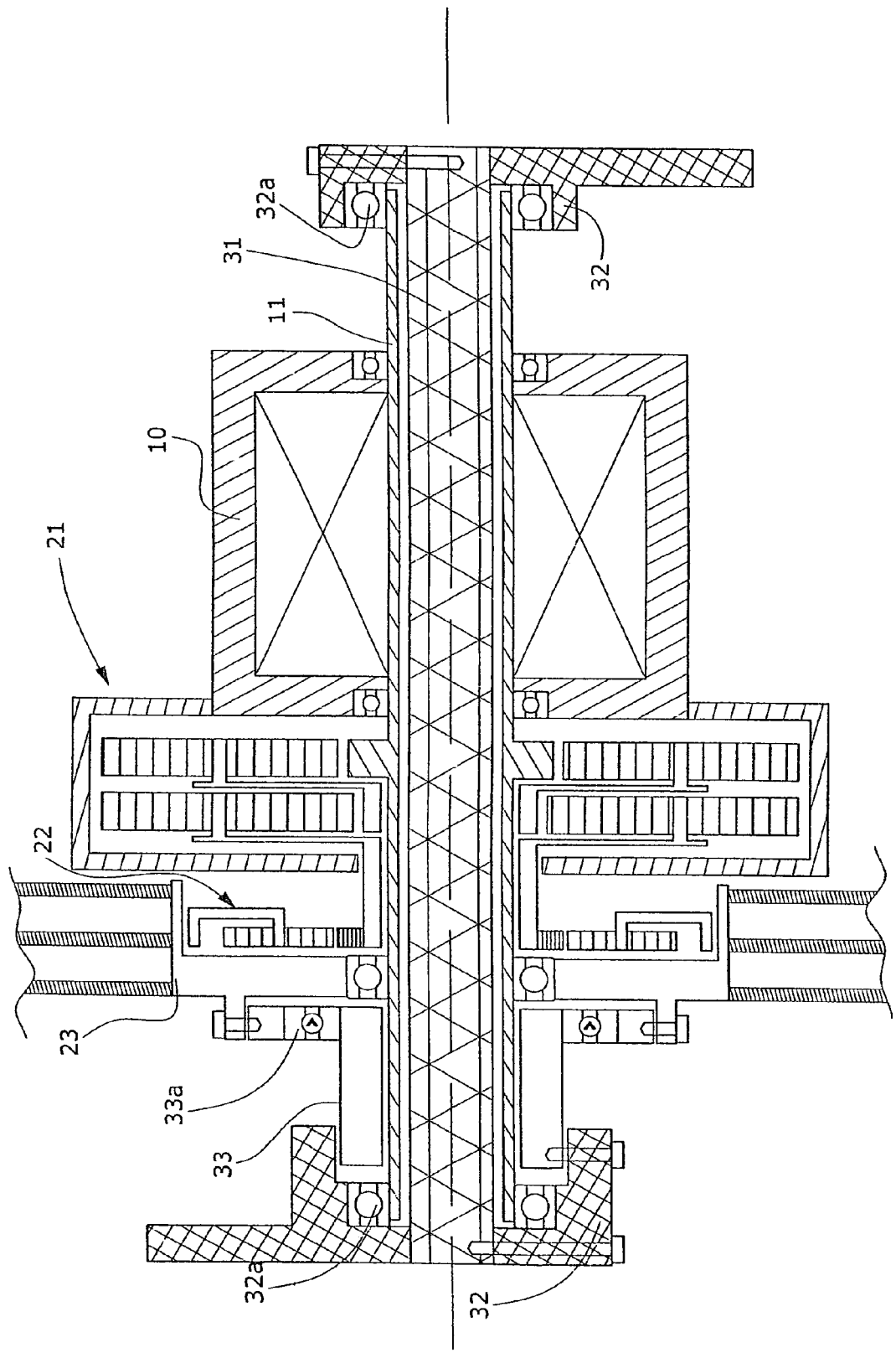
FIG. 2 shows a sectional side view according to the invention.

To better understand the invention, detailed descriptions of a preferred embodiment shall be given with the accompanying drawings below. Referring to FIGS. 1 and 2, an electric bicycle power structure according to the invention comprises a motor 10, a power exchange device 20 and pedal interlocking shafts 30.

The motor has a hollow tube 11 forming an axis, which is provided with a gear 11a at an appropriate position at a front end thereof.

Figure 3A:
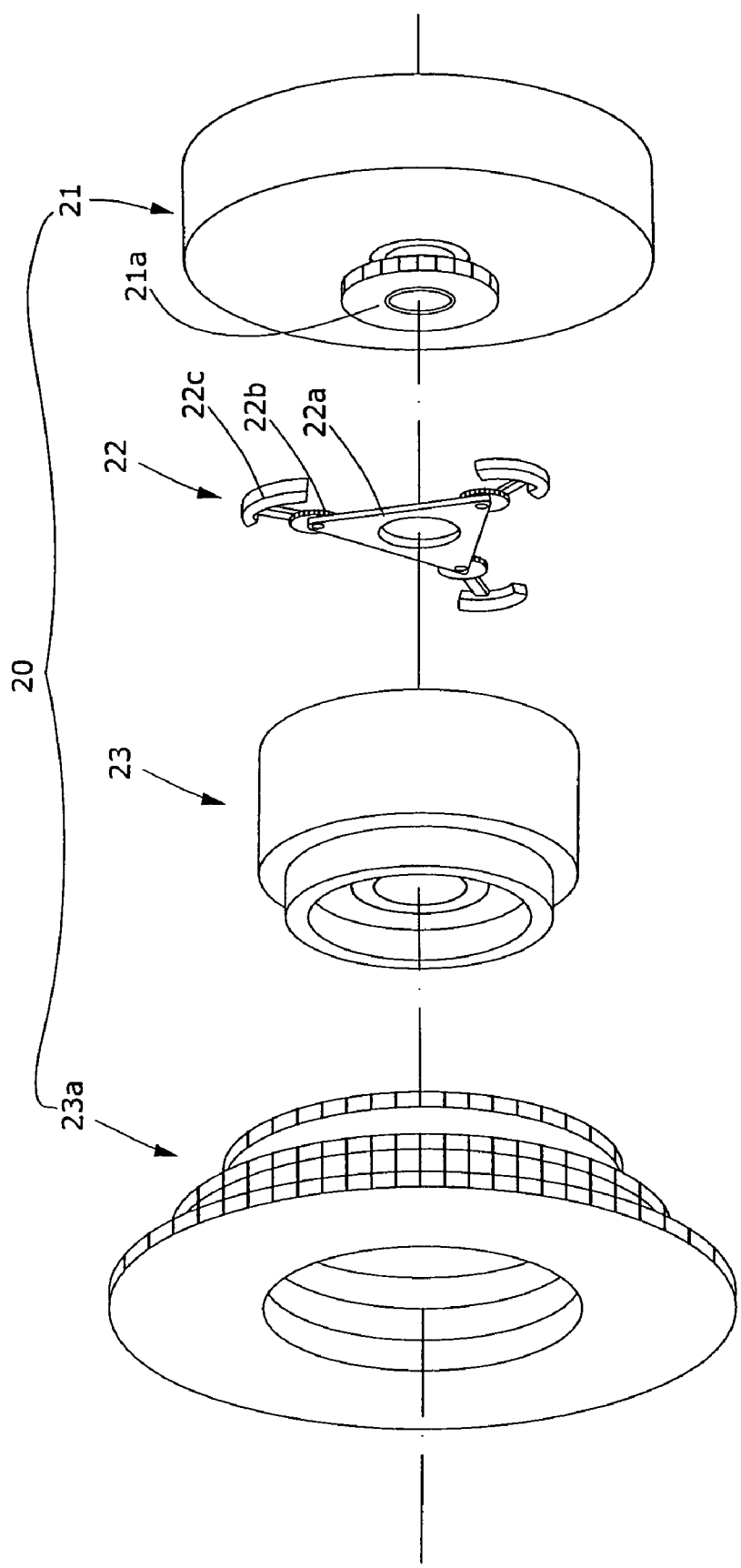
FIG. 3A shows an exploded elevational view of a power exchange device according to the invention.
Figure 3B:
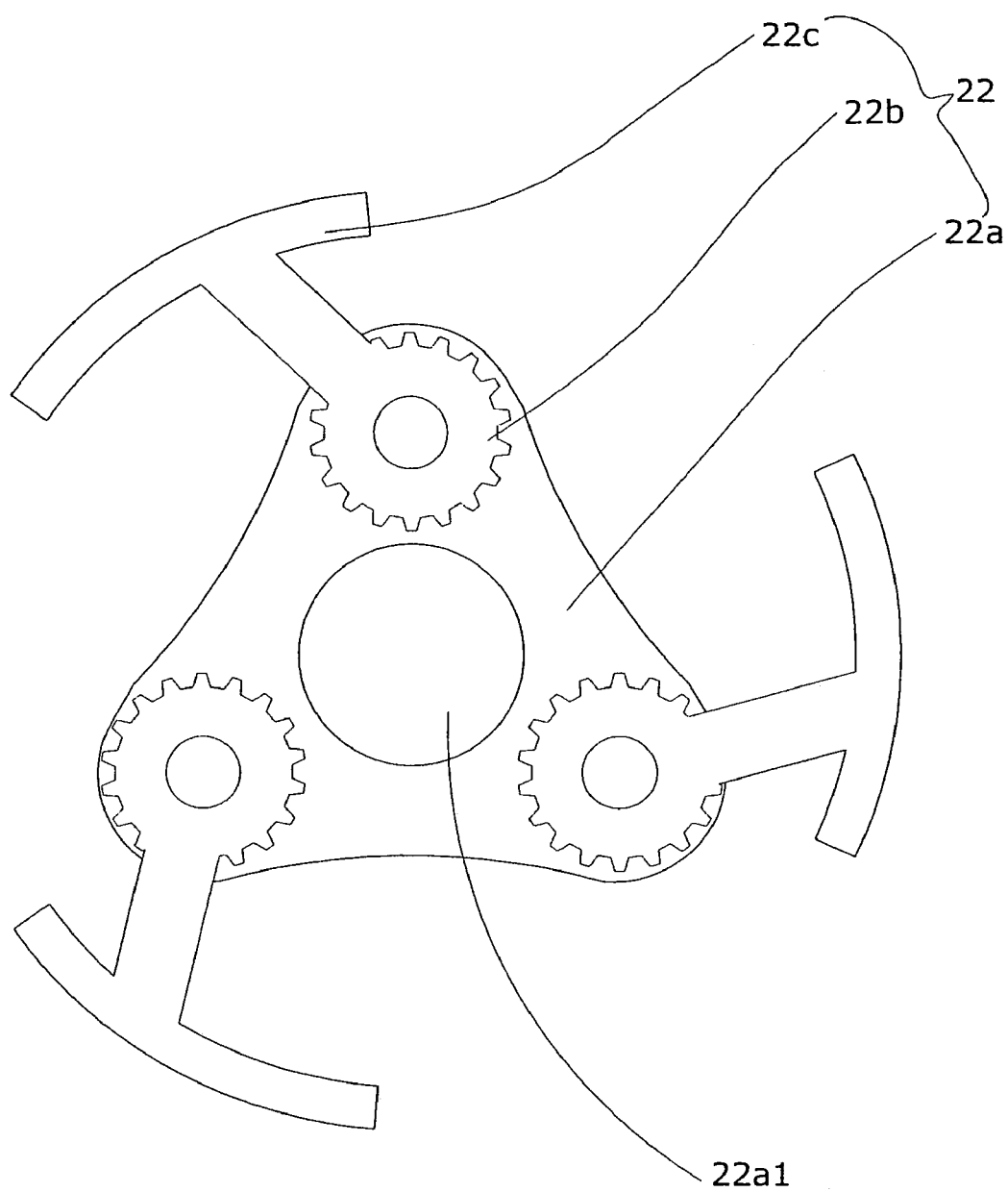
FIG. 3B shows a planar view of a clutch according to the invention.

Referring to FIGS. 3A and 3B, the power exchange device 20 has a planet decelerating mechanism 21, a clutch 22 and a chain wheel cover 23; and is disposed at a front end of the motor 10. The gear 11a at the hollow tube 11 of the motor 10 is pivotally disposed at a center of the planet decelerating mechanism 21, and is connected to an interior of the planet decelerating mechanism 21. The planet decelerating mechanism 21 has a protruding central gear 21a disposed at a front end thereof and also pivotally at a center of the clutch 22. The clutch 22 is installed at a center of the chain wheel cover 23; and is consisted of a triangular locating plate 22a, three planet gears 22b, and clutch plates 22c coaxial with the planet gears 22b. The clutch plates 22c can also be a formed integral with the planet gears 22b. By leaning the clutch plates 22c of the clutch 22 against an inner side of the chain wheel cover 23, and using a plurality of teeth 23a at an outer wall of the chain wheel cover 23, the power exchange device 20 can be connected to an existing transmission system of the bicycle without affecting transmission functions to further provide different power requirement options.

The pedal interlocking shaft 30 has a central axis 31, outer covers 32 at two sides thereof, and a joining cover 33. The central axis 31 is pivotally disposed at the center of the hollow tube 11 of the motor 10. The outer cover 32 is disposed with a roller bearing 32a at an interior thereof, such that two ends of the hollow tube 11 of the motor 10 are respectively positioned in the roller bearing 32a, while the central axis 31 of the pedal interlocking shaft 30 is inserted into the hollow tube 11 without coming into contact with the hollow tube 11. A position where the pedal interlocking shaft 30 at one side of the bicycle joins with the chain wheel cover 23 is provided with the joining cover 33. The joining cover 33 is disposed with a one-directional axis 33a at an interior thereof; and has a front end thereof accommodated by an inner wall of the outer cover 32 of the pedal interlocking shaft 30, and a rear end thereof fastened in the chain wheel cover 23.

Figure 4A:
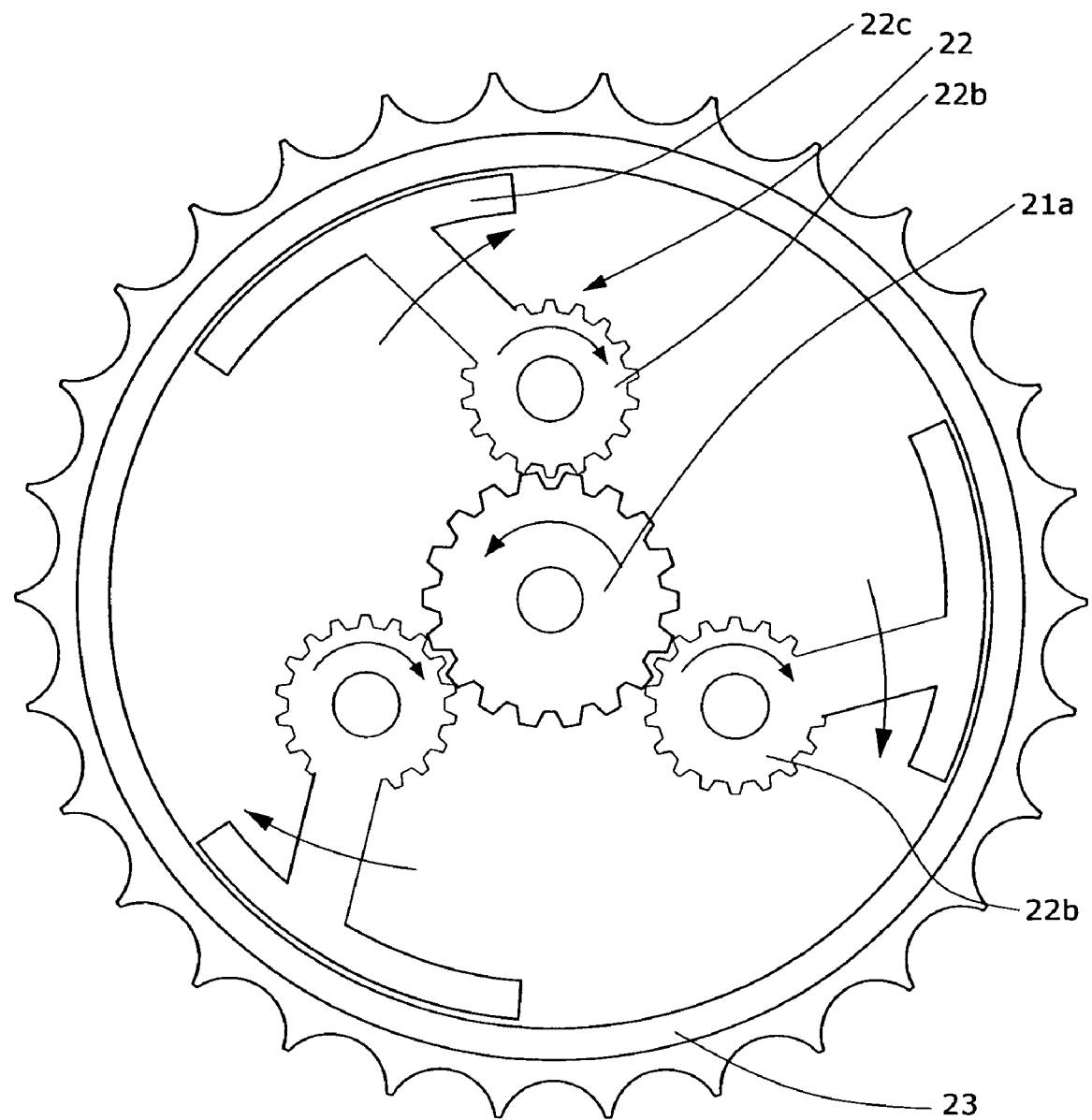
FIG. 4A shows a first schematic view illustrating actions of a clutch according to the invention.
Figure 4B:
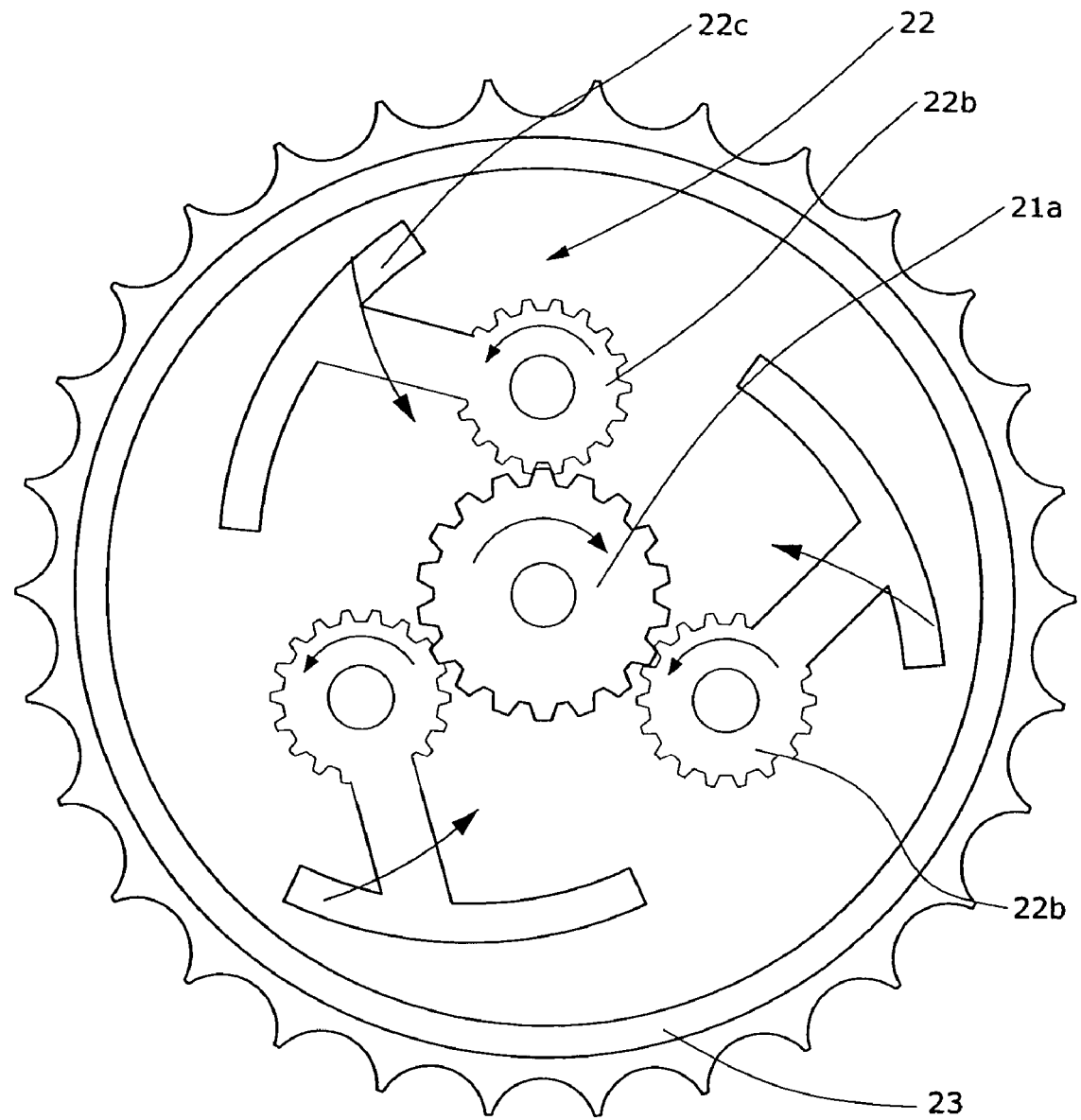
FIG. 4B shows a second schematic view illustrating actions of a clutch according to the invention.

Referring to FIGS. 3B, 4A and 4B, according to the aforesaid structure, the clutch 22 is installed at the center of the chain wheel cover 23, and is consisted of the triangular locating plate 22a, three planet gears 22b, and the clutch plates 22c coaxial with the planet gears 22b. The central gear 21a of the planet decelerating mechanism 21 is disposed at a central opening 22a1 of the triangular locating plate 22a in a penetrated manner, with the central gear 21a exactly and simultaneously engaged with the three planet gears 22b. In addition, each of the clutch plates 22c is interlocked with a central axis of each of the planet gears 22b. Thus, when the central gear 21a rotates in an anti-clockwise direction, all the three planet gears 22b at an outer periphery thereof rotate in a clockwise direction, such that the clutch plates 22c are impelled to rotate in a clockwise direction as well as forming an open status to further produce power by driving the chain wheel cover 23. Vice versa, when the chain wheel cover 23 rotates at a speed greater than that of the internal central gear 21a, the clutch plates 22c rotate in an anti-clockwise direction and gather toward the center, such that the planet gears 22b are impelled to rotate in an anti-clockwise direction whereas the central gear 21a rotates in a clockwise direction, and thus power is not transmitted to the chain wheel cover 23 as a result.

Conclusive from the above, the electric bicycle power structure according to the invention is provided with a power exchange device according to the invention and a main body according to a prior bicycle. The invention accomplishes effects of energy saving, offering enhanced usage conveniences, and avoiding significantly modifications to prior bicycle structure for reducing production costs.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. An electric bicycle power structure comprising a motor, a power exchange device and pedal interlocking shafts; being capable of assisting an electric bicycle to produce power by one of the motor and the pedal interlocking shafts, and automatically switching between the motor and the pedal interlocking shafts for achieving power saving effects and offering enhanced usage conveniences; and characterized that, the motor has a hollow tube forming an axis, which is provided with a gear at an appropriate position at a front end of the hollow tube;

the power exchange device has a planet decelerating mechanism, a clutch and a chain wheel cover, and is connected to an interior of the planet decelerating mechanism having a front end thereof disposed with the clutch; the gear on the hollow shaft of the motor is pivotally disposed to a center of the planet decelerating mechanism to connect with an interior of the planet decelerating mechanism; the planet decelerating mechanism has a protruding central gear disposed at a front end thereof and also pivotally at a center of the clutch; and the chain wheel cover is provided with a plurality of teeth at an outer wall thereof; and the pedal interlocking shafts have a central axis, outer covers at two sides thereof, and a joining cover; the central axis is rotatable disposed at the center of the axis of the motor; the outer covers are disposed with roller bearings at interiors thereof, such that two ends of the axis of the motor are respectively positioned in the roller bearings, while the central axis of the pedal interlocking shafts are inserted into the hollow tube without coming into contact with the hollow tube; a position where a pedal interlocking shaft at one side joins with the chain wheel cover is provided with the joining cover; the joining cover is disposed with a one-directional axis at an interior thereof, and has a front end thereof accommodated by an inner wall of the cover of the pedal interlocking shaft, and a rear end thereof fastened in the chain wheel cover.

2. The electric bicycle power structure in accordance with claim 1, wherein the clutch is installed at a center of the chain wheel cover; the clutch consisting of a triangular locating plate, three planet gears, and clutch plates coaxial with the planet gears; and are leaned against an inner side of the chain wheel cover using the clutch plates of the clutch.

3. The electric bicycle power structure in accordance with claim 1, wherein the teeth at the chain wheel cover are joined with an existing transmission system of the bicycle without affecting transmission functions to further provide different power requirement options.

4. The electric bicycle power structure in accordance with claim 2, wherein the clutch plates are integrally formed with the planet gears.

* * * * *